INVENTOR.
THOMAS MOLLINGA
BY
Christie, Parker & Hale
ATTORNEYS.

INVENTOR.
THOMAS MOLLINGA
BY
Christie, Parker & Hale
ATTORNEYS.

United States Patent Office 3,201,611
Patented Aug. 17, 1965

3,201,611

STAIRCASE-WAVEFORM GENERATOR EMPLOYING TWO CONTROLLABLE RAMP SIGNAL GENERATORS COMBINED AT THE OUTPUT

Thomas Mollinga, Sierra Madre, Calif., assignor to Burroughs Corporation, Detroit, Mich., a corporation of Michigan Filed Feb. 18, 1963, Ser. No. 259,329
9 Claims. (Cl. 307—88.5)

This invention relates to voltage waveform generators and, more particularly, to generators for producing signals having a substantially rectangular waveform of either the square wave or staircase type.

The generation of various waveforms is required for many different applications. The waveforms may take one of many different configurations such as sawtooth waveforms or rectangular waveforms. In counting circuits and frequency dividers, a particularly advantageous waveform is the rectangular staircase waveform. Staircase waveforms in a counting circuit are used extensively in nuclear physics experiments and also in radar and loran equipment. One of the more recent uses for staircase waveforms is in display instrumentation and, in particular, the observation of the curve traces representing the different parameters of a transistor. These waveforms are additionally employed in the television field and, in particular, color television.

The normal method of generating a signal having a staircase waveform is to employ a free-running multivibrator, which generates square waves, in conjunction with a timing capacitor and a storage capacitor. Successive pulses are applied to the storage capacitor through the timing capacitor to charge the storage capacitor in several steps. The amplitude of the steps are determined by the amplitude and duration of the multivibrator signals. During the noncharging portion of the operation or between the pulses, the storage capacitor is required to maintain a fixed voltage level. The rise time or the steepness of the waveform is determined by the value of the capacitor and its charging circuit. For short rise times, a large current and/or small storage capacitor is required. However, a small capacitor will not hold a fixed voltage level for a sufficient long period of time due to the load across it. Either the storage capacitor requires a certain period of time in which to charge so the steps are not steep or the fixed voltage levels vary, whereby an undesirable non-rectangular waveform results. The rate of leakage of charge from the capacitor places an upper limit on the period of a complete cycle of the staircase waveform and the characteristics of the charging path of the storage capacitor determines the steepness of the waveform.

It is desired to have a staircase waveform generator which does not employ a storage capacitor in order to overcome the inherent limitations introduced by such a capacitor. Therefore, in accordance with the invention, a particularly advantageous waveform generator comprises two sources of signals having sawtooth waveforms and a linear amplifier, wherein one sawtooth waveform is applied as the normal input signal of the amplifier and the other sawtooth waveform is applied as the supply or operating voltage of the amplifier. Thereafter, there is a phase inversion of the one sawtooth waveform and a summing of the waveforms to produce the staircase waveform.

The above and other features and advantages of the present invention will be understood more clearly and fully upon consideration of the following specification and drawing, in which.

Figure 1:
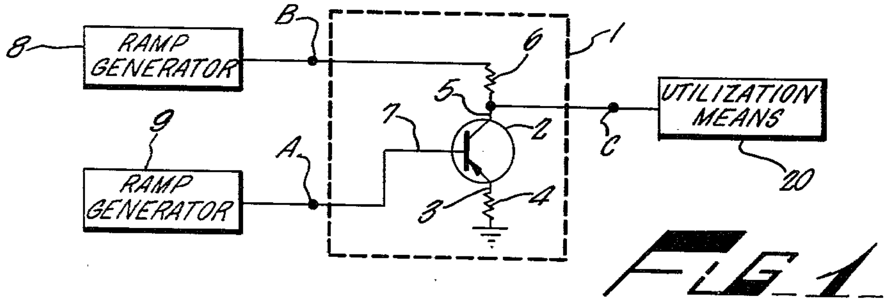
FIG. 1 is a schematic diagram of a preferred embodiment of a waveform generator, in accordance with the invention.

In accordance with the present invention, a waveform generator, as shown in FIG. 1, includes a means for combining two sawtooth waveform signals to produce the desired waveform. The means for combining the two signals comprises an amplifier 1. The amplifier 1 has an input terminal A, which is the normal input terminal, and an input terminal B. The amplifier 1 may be any of the well-known amplifiers, but is shown for illustrative purposes as a transistor amplifier. The amplifier comprises, as the active element, a transistor 2 connected in a common emitter configuration, whereby emitter 3 of the transistor is connected to ground reference through a resistor 4. The collector 5 is connected to input terminal B through a resistor 6 and the base 7 is connected directly to input terminal A. The output from the amplifier is taken from the collector and appears on the output terminal C. This output signal is thereafter coupled to a utilization means 20.

A first signal having a sawtooth waveform is applied to input terminal B and through resistor 6 appears at collector 5. This signal is generated by a ramp generator 8 and is applied as the supply voltage to the amplifier 1. A second signal having a sawtooth waveform is applied to input terminal A and appears on base 7. This signal is generated by ramp generator 9 and appears as the input signal to the amplifier 1.

Figure 2:
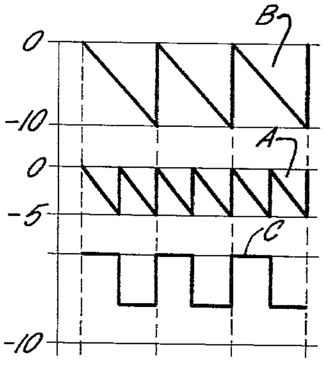
FIGS. 2, 3 and 4 are pictorial diagrams of waveforms of the signals that are present for different operating conditions in the waveform generator of FIG. 1.
Figure 3:
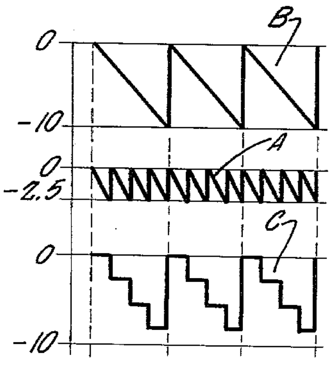
Figure 4:
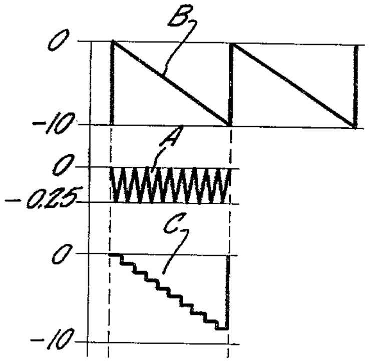

The waveforms of the signals applied to the amplifier and which appear at the output of the amplifier for different signal conditions are shown in FIGS. 2, 3 and 4. Initially, it is assumed, for example, that the signals shown in FIG. 2 are applied to input terminals A and B. These signals have waveforms A and B, which are sawtooth waveforms that have the same slope. The signal applied to terminal A is at least twice the frequency of the signal applied to point B.

When the signals applied to points A and B have the same slope, the gain of the amplifier will be selected to be unity. Also, the resistance of resistors 4 and 6 will be selected so as to be substantially equal. The signals applied at terminal A will have a phase inversion and will appear at output terminal C of the unity gain amplifier without any increase in amplitude. Waveform C of FIG. 2 results from the summing of the input signal from generator 8 and the inverted signal from generator 9. This signal will appear at the output terminal C in FIG. 1. It is seen in FIG. 2 that a substantially square wave signal is produced.

The application of a signal to input terminal A, which has a frequency that is twice the frequency of the signal applied to input terminal B, produces this special case of a staircase waveform, i.e., a square wave. However, a more typical staircase waveform is produced, when employing a unity gain amplifier as the means for combining the sawtooth waveforms, by increasing the frequency of the signal applied to input terminal A. Thus, it is assumed that the signals having the waveforms shown in FIG. 3 are applied to the input terminals of amplifier 1 in FIG. 1. The signal applied to terminal B is seen to vary linearly between zero and −10 volts. This signal supplies the voltage for the operation of the amplifier 1. The input signal at point A varies between zero and −2.5 volts and biases the amplifier in its conducting state while the other signal is applied to terminal B. The signal applied to point A is assumed to have a frequency 4 times that of the signal applied to point B. Thereafter, the output signal appearing at point C will have the waveform C shown in FIG. 3. Thus, a staircase waveform is produced.

It is noted that during the first pulse of the signal applied to terminal A, the voltage on the base 7 is equal to the voltage on the collector 5, which is supplied by the signal applied to terminal B. When the voltages applied to these two terminals are equal, the conducting state of the transistor 2 is undetermined and distortion may result in the output waveform. Therefore, the resistance values of the resistors 4 and 6 are made unqeual so that the amplifier will now have increased gain over that of unity. Thereafter, the input signal applied to base 7 will be amplified. The signal appearing at input terminal A is now reduced in amplitude and has a variation in voltage with respect to time that is unequal to the variation in voltage with respect to time of the signal applied to input terminal B. Thus, a difference in slope will exist. This difference will be compensated for by the increased gain of the amplifier so that the signal appearing on the collector 5, due to the input signal at input terminal A, will have a slope identical to the slope of the input signal applied to terminal B.

It is assumed, for illustrative purposes, that signals having the waveforms shown in FIG. 4 are applied to the input terminals A and B of the amplifier 1 of FIG. 1. The signal applied to terminal B again supplies the operating voltage for the amplifier 1. The signal applied to point A is now assumed to have a repetition rate 10 times that of the repetition rate of the signal applied to terminal B. Additionally, the signal applied to point A has a slope on a variation in voltage with respect to time, that is, one fourth the slope or variation in voltage with respect to time that is present in the signal applied to terminal B. Thereafter, the gain of amplifier 1 is selected to be 4, whereby the signal applied to terminal A is amplified by a factor of 4 so that it will appear in the output with a slope equal to the slope of the signal applied to point B. The signal appearing at the output terminal C will now have the waveform C shown in FIG. 4.

Figure 5:
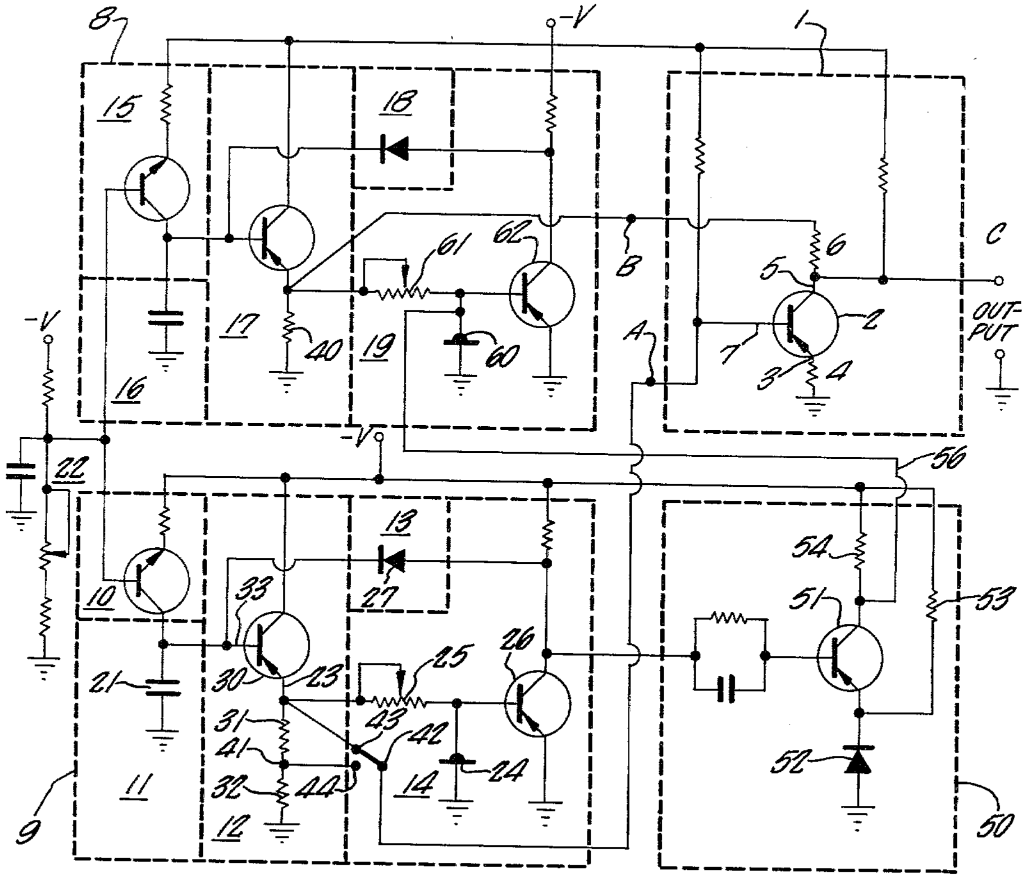
FIG. 5 is a schematic diagram of a preferred embodiment of the ramp generators employed in the waveform generator, in accordance with the invention.

A preferred embodiment of the ramp generators 8 and 9 is shown in FIG. 5. The construction of the generators is substantially identical and the operation of both of them may be understood from a description of only one. Ramp generator 8 is shown positioned above ramp generator 9 in FIG. 5. The amplifier 1 is positioned to the right of ramp generator 8 and has the same reference numerals as shown in FIG. 1.

Ramp generator 9 essentially comprises five distinct circuits which are a constant current source 10, a timing device 11, a buffer amplifier 12, a low impedance path 13 and a switch 14. Ramp generator 8 similarly comprises a constant current source 15, timing device 16, buffer amplifier 17, low impedance path 18 and switch 19. The constant current generators 10 and 15 employ a common control circuit 22 so that the slope of the signal appearing at the output of their respective timing devices will be equal and to enable simultaneous control over the two ramp generators.

The constant current source 10 of ramp generator 9 supplies charging current to a timing capacitor 21. Thus, the capacitor charges on a linear curve through the high impedance of the current source 10. Buffer amplifier 12 has its input connected to timing capacitor 21 so that it is responsive thereto. The buffer amplifier 12 advantageously comprises a cathode follower circuit or an emitter follower circuit which presents negligible loading effect across the timing capacitor 21, but has a low output impedance for the coupling of the signal of the amplifier 1. Buffer amplifier 12 comprises a transistor 30, as the active element, connected in an emitter follower configuration. An emitter 23 is connected to the ground reference through a series combination of a resistor 31 and a resistor 32. A base 33 is connected directly to the timing capacitor 21. Since the buffer amplifier 12 is an emitter follower, the voltage appearing at the emitter will have the same waveform as the voltage on its base, which is the voltage across the timing capacitor 21. Therefore, the voltage appearing at emitter 23 will follow the linear voltage change of the capacitor 21.

A switch 14 is connected to the emitter 23 and is, thus, responsive to the voltage across timing capacitor 21 through the buffer amplifier 12. Switch 14 comprises a tunnel diode 24, a variable resistor 25, and a transistor switch 26. The tunnel diode 24 is a current sensitive device which has two voltage states and in the circuit normally operates in its low voltage state. As the voltage appearing at emitter 23 increases, the current through the tunnel diode 24 and the variable resistor 25 will increase. When the current reaches the peak point current of the tunnel diode, the diode will switch to its other stable state, i.e., its high voltage, low current state. When tunnel diode 24 switches, a large negative potential will be applied between the base and emitter of transistor 26 so that it will switch to its conducting state. The turning on of transistor 26 will essentially apply a ground reference to one side of the low impedance path 13, which consists of a diode 27. The other side of the diode 27 is connected to the timing device 21 and will have a negative potential applied thereto. Thus, the diode is forward biased and will be in its low impedance state. This low impedance path is applied directly across the timing capacitor 21 through switch 26, so that the timing capacitor 21 will rapidly discharge to complete one cycle of the sawtooth waveform.

As noted above, the output of buffer amplifier 12, which appears at the emitter 23, follows the voltage across the timing capacitor 21. With the capacitor charging linearly through the constant current source 10, the voltage at emitter 23 will also vary linearly. Thus, waveform A of FIG. 2 will appear at emitter 23. The linear decrease from the reference voltage level takes place while the timing capacitor 21 is charging through the constant current source 10. When the voltage at the emitter 23 reaches a value sufficient to cause tunnel diode 24 to switch, thereby closing transistor switch 26, the timing capacitor 21 will rapidly discharge through transistor switch 26 and the low impedance path through diode 27. Thus, the portion of the waveform in FIG. 2, which rapidly changes from −5 volts to approximately 0 volts, is created. A comparison of the voltage levels that occur simultaneously at points A, B and C of amplifier 1 indicates that the short rise time in waveform A takes place when waveform C is stepping to a new voltage level. Thus, waveform C will have as steep a wavefront during each step as does the waveform A during the discharge of the timing capacitor 21. This is one of the significant differences between the present waveform generator and the prior art waveform generators which employ storage capacitors. In the prior art devices, the wavefront or steps between voltage levels in the staircase waveform occur during the charge of a storage capacitor. In making the storage capacitor sufficiently small to produce steep wavefronts or fast rise times, distortion is introduced by the inability of the small capacitor to maintain a fixed voltage level between charging periods.

As discussed in connection with FIG. 1, the signals that are applied to input terminals A and B may either have the same slope and different repetition rates or may have different slopes in addition to different repetition rates. Since ramp generator 8 is substantially the same as ramp generator 9, it is possible to employ components of identical value in the two generators to produce output signals having identical slopes. In ramp generator 8, the output signal is taken from a resistor 40 in buffer amplifier 17. If the resistance of resistor 40 in ramp generator 8 and the combined resistance of resistors 31 and 32 in ramp generator 9 are equal, in addition to all other components being substantially the same, the output signals from the two generators will have identical slopes. Thereafter, the waveform A of FIG. 3 which has a repetition rate that is four times the repetition rate of waveform B, may be produced in ramp generator 9 by varying the magnitude of the current through tunnel diode 24. The magnitude of this current is determined by the resistance of resistor 25 and the voltage appearing at emitter 23. Thus, if identical voltages appear at the emitters in the buffer amplifiers 17 and 12 of ramp generators 8 and 9, respectively, the difference in repetition rate will be determined by the time of switching of the tunnel diodes and transistor switches. Thereafter, the input to amplifier 1 at terminals A and B will have the same slope and a unity gain amplifier may be employed.

However, as previously noted, there is a possibility of distortion during the initial application of the pulses to the amplifier when a unity gain amplifier is employed. Therefore, it is desirable that the signal appearing at input terminal A be of smaller amplitude than the signal appearing at input terminal B. An advantageous way of accomplishing this is to take the output signal from ramp generator 9 at a junction point 41 between resistors 31 and 32 to effect an attenuation of the signal. Thus, by adjusting the resistance ratios of the resistors 31 and 32, it is possible to select any desired voltage level. A switch 42 is connected in the output circuit between buffer amplifier 12 and amplifier 1. By moving the arm of switch 42 to make contact with a terminal point 44, which is connected to the junction point 41, the output signal from ramp generator 9 will be reduced in amplitude and will have a changed slope, as typically shown in waveform A of FIG. 4. The waveforms A and B in FIG. 4 are not on the same scale. In particular, waveform A varies between substantially zero volts and —0.25 volt while waveform B varies between substantially zero volts and —10 volts. However, if the waveforms were shown on the same scale, the slope of the signals at A would be smaller than at B, i.e., the ramps at A are *slower* than at B.

In many applications it is desirable that the signals from the ramp generators 8 and 9 terminate at the end of a complete cycle or in synchronism. Thus, a synchronizing circuit is connected between ramp generator 9 and ramp generator 8. The synchronizing circuit 50 comprises an active element 51 and associated circuitry. Active element 51 is a transistor having its emitter connected to the ground reference through a diode 52. The emitter is also connected to the negative supply voltage through a resistor 53. The combination of resistor 53 and diode 52 supplies a bias potential to the transistor 51. The collector of transistor 51 is connected to the negative supply voltage through a resistor 54.

The synchronizing circuit is responsive to the operation of transistor switch 26 in ramp generator 9 through the connection of the base of transistor 51 to the collector of transistor switch 26. Thus, when transistor switch 26 closes to discharge the timing capacitor 21 and to produce a step in the output waveform from the waveform generator, ground reference will be applied to the base of transistor 51. This ground reference will bias transistor 51 at cut off. When transistor 51 shuts off, the voltage on its collector will increase negatively. A negative pulse will be produced during the short time that transistor switch 26 is operating. This negative pulse, which appears on line 56 at the output of synchronizing circuit 50, is applied to the switch 19 of ramp generator 8.

Switch 19 includes a tunnel diode 60, a resistor 61, and a transistor switch 62. The negative pulse from synchronizing circuit 50 is applied to tunnel diode 60 and will cause tunnel diode 60 to switch if sufficient negative voltage is then appearing across resistor 40 of buffer amplifier 17. The switching of tunnel diode 60 will cause switch 62 to close to effect the concurrent discharge of the timing device 16 of ramp generator 8. Thus, the termination of pulses from the output of the ramp generators is synchronized.

Figure 6:
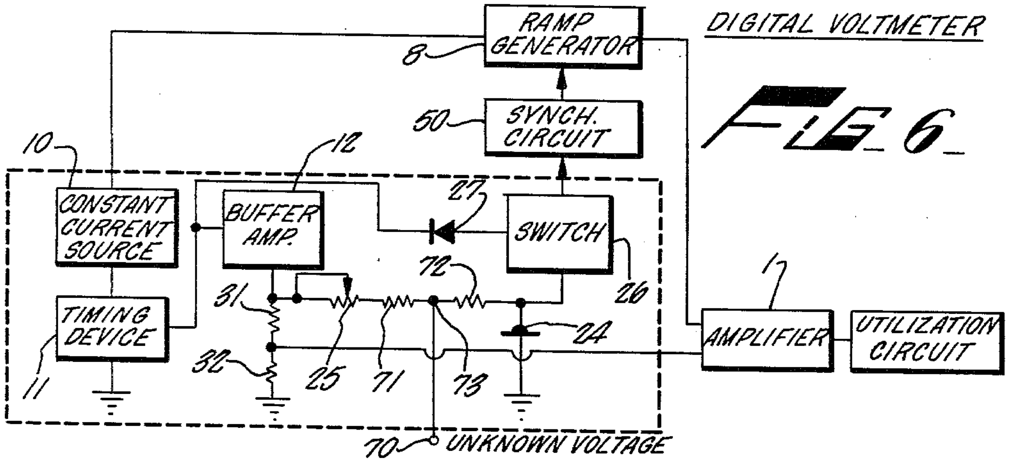
FIG. 6 is a block diagram, partially in schematic form, of the waveform generator of the present invention employed as a digital voltmeter.

The waveform generator of the present invention has particular application in a digital voltmeter. Such a use is shown in FIG. 6. The ramp generator, which determines the number of steps in the output waveform from the amplifier 1, is modified to include an input terminal 70 for an unknown voltage. It is assumed in FIG. 6 that the ramp generator, whic his being modified, is shown in general as ramp generator 9 in FIG. 5. The constant current source 10, timing device 11 and switch 26 are shown in block form and are understood to be similar to those shown in FIG. 5. The buffer amplifier is also substantially the same. The emitter follower load, resistors 31 and 32, is shown in FIG. 6. The current path through tunnel diode 24 is modified to include a pair of resistors 71 and 72 in series with resistor 25. The unknown voltage is applied to a junction point 73 between resistors 71 and 72 and acts as a bleeder source for the current flowing through tunnel diode 24. Thus, the current flowing through the tunnel diode 24 is varied by the application of this unknown voltage. Thereafter, the time of switching of the tunnel diode 24 and the completion of a cycle of the output signal from ramp generator 9 will be dependent upon the magnitude of this unknown voltage. Therefore, by proper calibration of the circut, and by having each step in the staircase waveform output from amplifier 1 representing a selected magnitude of voltage, the increase of decrease in the number of steps will be indicative of the magnitude of the unknown voltage.

Figure 7:
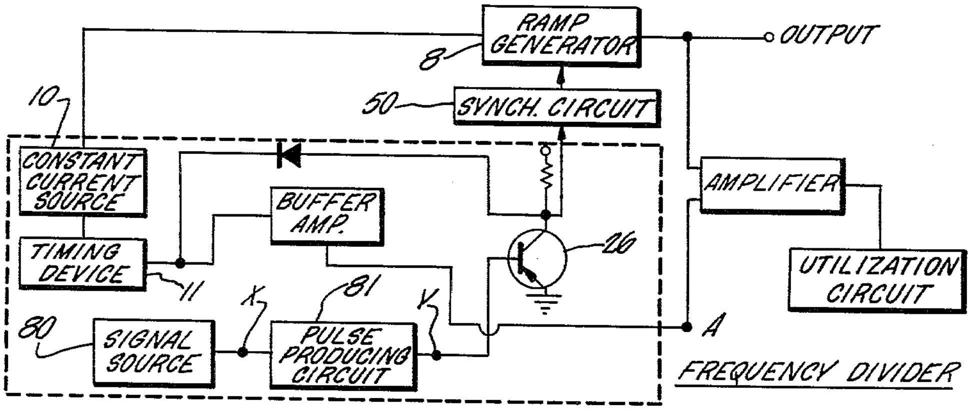
FIG. 7 is a block diagram, partially in schematic form, of the waveform generator of the present invention modified to operate as a frequency divider.
Figure 8:
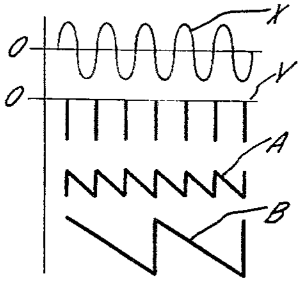
FIG. 8 is a pictorial diagram of the waveforms of the signals that appear in the frequency divider of FIG. 7.

The waveform generator of the present invention additionally is particularly applicable to a frequency divider circuit as shown in FIG. 7. The ramp generator 9 is now modified to make the transistor switch 26 sensitive to an external pulse rather than the state of a tunnel diode within the ramp generator. In particular, the tunnel diode and its series resistor are replaced by a signal source 80 and a pulse producing circuit 81. Signal source 80 produces an output signal having a waveform X as shown in FIG. 8. It is assumed, for illustrative purposes, that it is desired to reduce the frequency at the output of signal source 80 by a factor of 3. The output of source 80 is applied to the pulse producing circuit 81 which produces an output pulse for every zero crossing of the wave X having a positive slope. The output of pulse producing circuit 81 is represented by waveform Y in FIG. 8. The negative pulses appearing at point Y are applied to the base of transistor switch 26 to close the switch and to discharge the timing device 11. Thus, the repetition rate of the signal at the output of ramp generator appearing at point A will be determined by the repetition rate of the pulses appearing at point Y.

The ramp generators operate in synchronism through synchronizing circuit 50. Therefore, the output signal of ramp generator 8 will complete a full cycle at the same time that the output signal of ramp generator 9 completes a full cycle. As noted above, the ramp generator 8 will not complete a full cycle until the signal generated has a voltage level sufficient to couple the low impedance path to its timing device. This voltage level will only be applied upon the completion of a cycle by the ramp generator 9, thereby effecting synchronism.

Thereafter, the characteristics of the generator 8 may be varied to apply a sufficiently negative voltage to the switching circuit in the time it takes the input signal from source 80 to complete the selected number of cycles. Thus, the division by the frequency divider is variable.

What is claimed is:

1. In combination, a first ramp generator comprising a constant current source, a timing circuit responsive to the constant current source, a buffer amplifier for isolating the timing circuit from an output circuit, a switch connected to the output of the buffer amplifier, the switch being responsive through the buffer amplifier to the voltage level at the output of the timing circuit, a low impedance path, and means for connecting the timing circuit to the low impedance path through the switch; a second ramp generator comprising a constant current source, a timing circuit responsive to the constant current source, a buffer amplifier for isolating the timing circuit from an output circuit, a switch connected to the output of the buffer amplifier, the switch being responsive through the buffer amplifier to the voltage level at the output of the timing circuit, a low impedance path, and means for connecting the timing circuit to the low impedance path through the switch; and means responsive to the outputs from the first and the second generators for combining the outputs to produce a signal having a staircase waveform.

2. The combination in accordance with claim 1 wherein the first generator and the second generator have a common control circuit for their respective constant current sources.

3. A frequency divider comprising a source of signals at a first frequency, means responsive to the output of the source for producing pulses of voltage for each complete cycle of the signals from the first source, a first ramp generator having an output signal with a sawtooth waveform at a first controllable repetition rate, the first generator comprising a constant current source, a timing circuit responsive to the constant current source, a voltage responsive switch, a low impedance path, means for connecting the output of the pulse producing means to control the closing of the switch; means for connecting the low impedance path across the timing circuit through the switch in response to each pulse from the pulse producing means; a second ramp generator having an output signal with a sawtooth waveform at a repetition rate dependent upon the occurrence of a selected number of sawtooth waves from the first ramp generator; and means for synchronizing the operation of the second ramp generator with the first ramp generator.

4. A digital voltmeter comprising a first generating means for generating a first signal having a sawtooth waveform at a first controllable repetition rate; a second generating means for generating a second signal having a sawtooth waveform at a second controllable repetition rate, the second generating means comprising a timing capacitor, means for charging the capacitor substantially linearly, a buffer amplifier, means for terminating the sawtooth waveform by shortcircuitnig the timing capacitor, the terminating means including a tunnel diode, a switch responsive to the conduction state of the tunnel diode, and a connection for applying an unknown voltage to control the conduction state of the tunnel diode, means for coupling to the connection a voltage having a magnitude to be determined, means for synchronizing the termination of the sawtooth waveform from the first generating means with the termination of the sawtooth waveform from the second generating means; means for combining the output signals from the first and second generating means to produce a sawtooth waveform; and means for utilizing the output of the combining means.

5. A digital voltmeter comprising a first generating means for generating a first signal having a sawtooth waveform at a first controllable repetition rate; a second generating means for generating a second signal having a sawtooth waveform and a second controllable repetition rate, the second generating means comprising a timing capacitor, means for charging the capacitor substantially linearly, a buffer amplifier, means for terminating the sawtooth waveform by shortcircuiting the timing capacitor, the terminating means including a tunnel diode, a switch responsive to the conduction state of the tunnel diode, a current bleeder circuit responsive to variable voltage levels connected across the tunnel diode, and means for applying the variable voltage levels that are to be determined to the bleeder circuit; means for combining the output signals from the first and second generating means to produce a sawtooth waveform, and means for utilizing the output of the combining means.

6. A staircase waveform generator comprising a first source of sawtooth waves having a first variable repetition rate, a second source of sawtooth waves having a second variable repetition rate, means for combining the outputs of the first and second sources to produce a signal having a staircase waveform, means in the second source for controlling the amplitude of the steps in the output staircase signal, the controlling means including a tunnel diode and variable resistor connected in series.

7. A waveform generator comprising a first generating means for generating a first signal having a sawtooth waveform, a second generating means for generating a second signal having a sawtooth waveform, means for combining the outputs of the first and second generating means to produce a signal having a staircase waveform, the second generating means including a circuit having cathode follower characteristics and a multi-tapped load resistor whereby the slope and amplitude of the second sawtooth waveform is variable.

8. In combination, a first generating means for generating a first signal having a sawtooth waveform, a second generating means for generating a second signal having a sawtooth waveform, means for combining the outputs of the first and second generating means to produce a signal having a staircase waveform, the first generating means including a circuit for controlling the repetition rate and amplitude of the first signal, the second generating means including a first circuit for controlling the repetition rate and amplitude of the second signal, and a second circuit for controlling the amplitude and slope of the second signal.

9. A waveform generator comprising a first source for producing a first signal having a sawtooth waveform, a second source for producing a second signal having a sawtooth waveform and means for combining the first and second signals to produce a signal having a staircase waveform, the first source comprising a timing capacitor, means for charging the capacitor substantially linearly, a buffer amplifier, a voltage sensitive switching circuit connected across the capacitor through the buffer amplifier for shortcircuiting the timing capacitor at selected intervals through the switching circuit, the buffer amplifier having cathode follower characteristics and a load resistor, means for coupling an output signal from across the load resistor to the combining means, the second signal source comprising a timing capacitor, means for charging the capacitor substantially linearly, a buffer amplifier, a voltage sensitive switching circuit connected across the capacitor through the buffer amplifier for shortcircuiting the timing capacitor at selected intervals through the switching circuit, the buffer amplifier having cathode follower characteristics and a load resistor, and means for coupling the output signal from the second signal source from across the load resistor to the combining means.

References Cited by the Examiner

UNITED STATES PATENTS

| | | | |
|---|---|---|---|
| 2,414,096 | 1/47 | Dimond | 315—24 |
| 2,881,388 | 4/59 | Behrend | 328—188 |
| 3,007,060 | 10/61 | Guenther | 307—88.5 |

ARTHUR GAUSS, *Primary Examiner.*

UNITED STATES PATENT OFFICE

CERTIFICATE OF CORRECTION

Patent No. 3,201,611 August 17, 1965

Thomas Mollinga

It is hereby certified that error appears in the above numbered patent requiring correction and that the said Letters Patent should read as corrected below.

Column 2, line 50, strike out "least"; column 3, line 20, for "unqeual" read -- unequal --; column 4, line 3, for "of", second occurrence, read -- to --; column 6, line 15, for "whic his" read -- which is --; line 32, for "circut" read -- circuit --; same column 6, line 35, for "of", first occurrence, read -- or --.

Signed and sealed this 15th day of March 1966.

(SEAL)

Attest:

ERNEST W. SWIDER

Attesting Officer

EDWARD J. BRENNER

Commissioner of Patents